July 20, 1965  V. J. GILBERT  3,195,904
ROLL NECK SEAL
Filed Oct. 25, 1962  3 Sheets-Sheet 1

INVENTOR.
VERNON J. GILBERT
BY William D. Carothers
HIS ATTORNEY

INVENTOR.
VERNON J. GILBERT
BY
HIS ATTORNEY

July 20, 1965  V. J. GILBERT  3,195,904
ROLL NECK SEAL
Filed Oct. 25, 1962  3 Sheets-Sheet 3
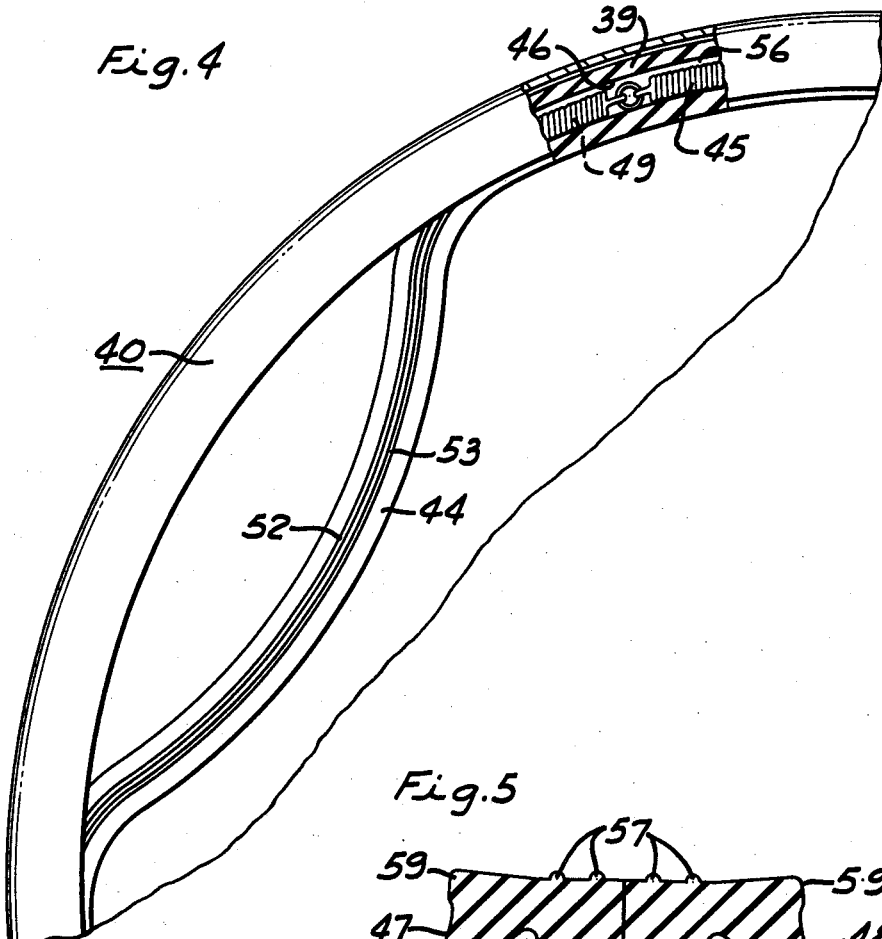
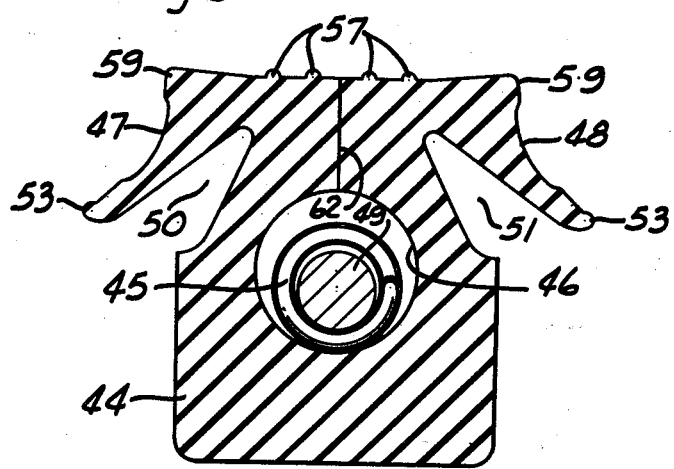
INVENTOR.
VERNON J. GILBERT
BY
HIS ATTORNEY

United States Patent Office 3,195,904
Patented July 20, 1965

3,195,904
ROLL NECK SEAL
Vernon J. Gilbert, Indiana, Pa., assignor, by mesne assignments, to Link-Belt Company, Chicago, Ill., a corporation of Illinois
Filed Oct. 25, 1962, Ser. No. 233,064
1 Claim. (Cl. 277—95)

This invention relates generally to shaft seals and more particularly to seals between the roll necks and their bearing housings to prevent the escape of lubricant from the roll neck bearings and also prevent the infiltration of water with scale and dirt which would quickly destroy the bearing after contaminating the lubricant.

Roll necks extend from the ends of rolls used in rolling out metal and other materials to reduce the thickness, finish, or otherwise work the material and treat the surface of the metal or material. Some rolls require backup rolls to apply pressure to the roll that engages the work to perform its function on the metal or material which is being rolled. In other instances the roll necks receive and transfer the working forces to the rolls and are sometimes required to drive the roll. In any event the roll necks are usually relatively smaller in diameter than that of the rolling surface. The neck is usually filleted where it joins the end of the roll and the neck may have some cylindrical step but is usually conical in order to provide strength to support and transmit the heavy loads on the rolls. Structures of this character provide limited space for bearings and a very small space for seals which results in the use of little or no provisions for seals permitting the bearings and roll necks to be washed by the dirty cooling water which ruins the bearings before their rolling surfaces are impaired or need changing.

Again rolls and roll necks will frequently break due to unbalanced loads or overloads while working. The sudden release of heavy load pressures has a terrific effect on the bearings that usually results in what is termed as bouncing when the lubricant is lost permitting the ingress of dirt and water which necessitates a thorough cleaning of the bearings and lubricant before reuse or they will quickly fail.

The problem is to provide a seal for a roll neck that is capable of movement with the bouncing bearings and housing parts due to repeated application and release of loads on the roll necks. When the roll or neck breaks it is necessary to maintain lubricant in the bearing parts and at the same time keep out the dirt and foreign matter that is apt to enter the bearings upon changing the rolls or the load limits thereon.

The seal comprising this invention has to be small as compared to the diameters of the roll neck. It has to be rugged and it must be capable of material radial movement while rotating to maintain its seal due to the bounce of the roll neck. This radial movement is as much as one-fourth of the dimension of the seal which is material for its size. At the same time the seal must maintain sealing contact during such rotary and radial movements. These seals are substantially square in cross section and have a head that is solid across the top and its bottom has a continuous narrower surface to grip the roll neck to rotate the seal with the roll neck and to maintain a seal therewith regardless of the radial or axial movement of the roll. The head of the seal extends between opposed parallel radial sealing surfaces that are held in sealed relation in the housing.

The seal body is made of plastic or rubber or other elastomer and its body is slightly narrower than its head and has clearance to normally be out of contact with the housing. On each side of the head of the seal is an expandable sealing surface that rides in contact confined with relative rotary and radial sealing relation with the parallel radial sealing surfaces. These expanding sealing surfaces are preferably of a natural deformed cross section of the elastomer seal which must be contracted to be inserted between the parallel radial sealing surfaces and substantially fill the same. Such expanding sealing surfaces may be in the form of annular flanges that normally project outwardly when free and extend toward the axis of the seal. Thus centrifugal force as well as fluid pressure will maintain these annular flanges in sealed relation with the parallel sealing surfaces.

The head of the seal also provides abutments to engage the outer surface of these flanges on the seal body. Each flange housing has a sealing face which is preferably made in the form of parallel spaced annular ribs. Both flanges and the abutments remain in relative rotary and radial contact with the spaced parallel radial sealing surfaces of the housing. The latter may be made in the form of an integral ring with an inwardly open annular slot and when the seal body is positioned in this slot between the radial sealing surfaces an independent annular perimetral chamber is formed.

The abutments on the head of the seal which engage the seal surfaces on the opposite sides of the housing prevent the seal from being rolled within the housing when it is inserted in position on the roll neck. It has been found that if the seal is smaller than the dimension between the seal surfaces and does not substantially fill the same the head has a tendency to roll or that if the body as well as the head of the seal is in contact with the seal surfaces the seal will have a tendency to roll within the housing and thus when the seal substantially fills the housing even though the head alone engages the opposed radial surfaces of the housing and the body is enabled to move between these sealing surfaces of the housing the seal will not roll when being inserted in place on the roll neck or under coniditions where there is axial movement between the roll neck and the housing because the body will first travel with the roll neck causing it to flex independently of the head and when it engages the sealing surfaces the body slides axially of the roll neck retaining its sealing engagement and thereby correcting the alignment between the head and the body. This independent action between the head and the body of the seal would not function if the head and the body were the same thickness and if the body engaged the opposed radial sealing surfaces of the housing.

This annular seal surface ring is preferably made of steel, brass, bronze, or other metal or material and is mounted into the roll neck bearing housing by a force fit. It is preferably made as a housing with opposed sealing surfaces. The whole of the elastomer seal members is thoroughly dusted with a lubricant such as graphite powder or flakes. A semifluid grease such as a heavy cup grease is then placed in the annular seal chamber before the graphite coated seal member is inserted. Since the annular seal surface ring has a press fit into the roll neck bearing housing it may be supplied by a grease pressure fitting with a check valve to replenish the supply of the sealing grease. The lubricant that this seal retains is oil which will not dissolve the sealing grease.

The elastomer seal body is preferably made as an extruded member and after it is cut to length and the garter spring with a constriction restrictor is inserted therein its ends are vulcanized together to form a complete annulus.

When subjected to fluid pressure, the seal flanges on both sides of the seal body expand with greater force against the coacting sealing surfaces as the fluid pressure of the lubricant being sealed increases since the pressure in the annular perimetral chamber is less. Any foreign matter that leaks by these sealing surfaces is trapped in this annular chamber and may be held there preventing damage to the bearings.

Another object is the provision of a roll neck seal that has a radial and an annular slit extending from the garter spring chamber upwardly through the head of the seal to permit the insertion of the garter spring and its constriction restrictor to form a circular element. This slit is preferably made after the seal has been formed as the unitary member by extrusion and butt molded at the ends to form a circular element. The slit permits the original surfaces that have been severed to interengage and permit the head to function as a single member before the slit and it does not interfere or otherwise change the characteristic of the head of the seal nor does it permit the seal to roll or otherwise twist within the housing, in view of the fact that the head abutments engage the sealed housing under pressure and the head functions as a unitary member even though it has been slit.

Other objects and advantages appear hereinafter in the following description and claim.

The accompanying drawings show for the purpose of exemplification without limiting the invention or claim thereto certain practical embodiments of this invention wherein:

FIG. 4 is a partial view of the seal in side elevation with a portion extended from the annular seal chamber.

FIG. 5 is a view of the seal member similar to that shown in FIG. 2 with its head slit and the constriction restrictor inserted therein.

Figure 1:
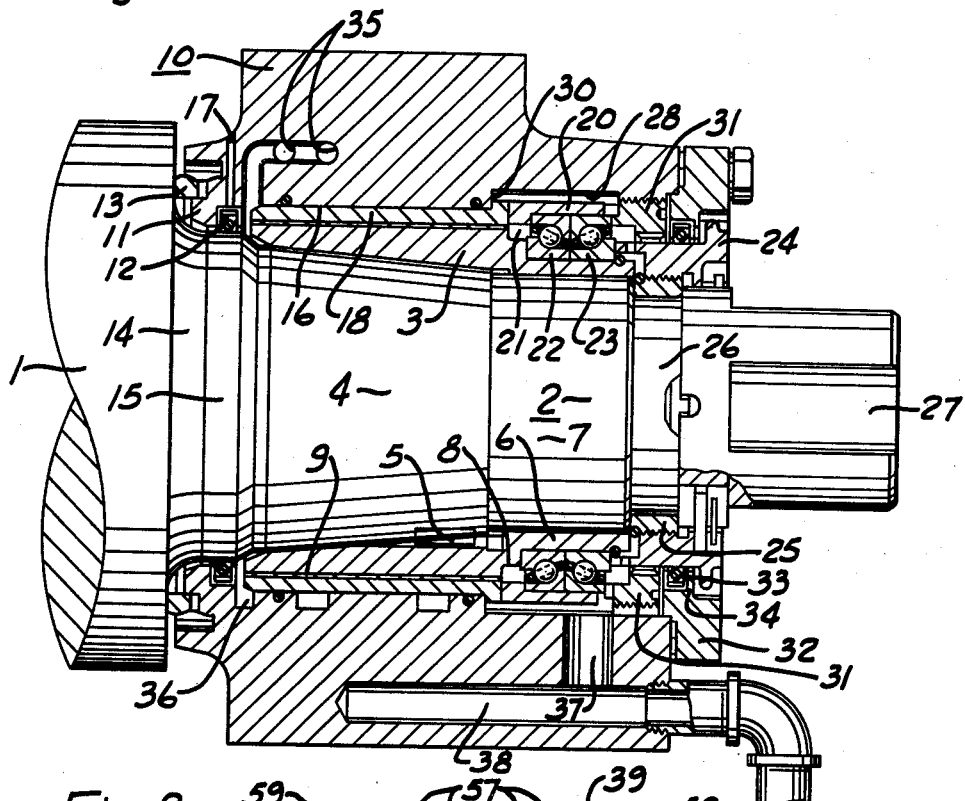
FIG. 1 is a sectional view showing a roll neck journaled within a roll neck housing and two seals mounted in place.

Referring to FIG. 1 the roll 1 is provided with a roll neck 2 at either end thereof, only one end being shown, which roll neck has mounted thereon a sleeve member 3 made to fit the tapered section 4 of the roll neck and keyed therewith by a key member 5. The outer end of the sleeve 3 is provided with a cylindrical section 6 that fits the cylindrical section 7 on the roll neck, the cylindrical section 6 providing an outer annular step 8 between its outer cylindrical surface and that cylindrical portion 9 which is concentric with the tapered section of the sleeve.

The roll neck housing as indicated at 10 has an inner annular projection 11 bored from the interior thereof to receive the inner seal member 12. The outer portion of the projection 11 is threaded to receive a ring 13 that substantially engages the end face of the roll 1 for the purpose of keeping large foreign particles from entering around the fillet 14 immediately adjacent the roll. Outwardly from the fillet 14 is a cylindrical surface 15 on which the seal member 12 functions.

The bore 16 of the housing 10 is larger than the small bore that receives the inner seal member 12 to permit the latter to be inserted through the housing and pressed into position as shown. A passageway such as indicated at 17 may be employed to add a heavy or semifluid grease to the sealing chamber through a suitable lubricating fixture not shown in FIG. 1.

The large bore 16 also receives the cadmium plated bushing 18 which functions as the sleeve bearing and has journaled therein the outer cylindrical surface 9 of the sleeve 3. The bushing 18 is likewise provided with an extension as indicated at 20 and which corresponds with the cylindrical extension 6 on the sleeve 3 being provided with the step 21. A pair of antifriction bearings 22 and 23 having races of opposite pitch are provided between the cylindrical surfaces 6 and 20 with their inner ends abutting the shoulders 8 and 21 respectively. The inner race of the bearing 23 is engaged by the inner end of the ring 24 which is threadably received on the exterior threaded split ring 25 mounted in the groove 26 of the roll neck 2. Thus by tightening the sleeve 24 on the threads of the ring 25 the thrust of the inner race 23 works against the thrust surface of the outer race of the bearing 23 which in turn forces the outer race of the bearing 22 against the shoulder 21. Thus the ring 24 rotates and becomes a part of the roll neck 2. The outer end of the roll neck 2 is provided with the drivehead 27.

An enlarged bore 28 is provided in the outer end of the housing 10 providing clearance for the bushing 18 and its cylindrical portion 20 which ends in a shoulder 30 for transmitting the force tending to move the roll to the left directly to the bearing housing 10. The outer end of the bore 28 is threaded to receive the lock ring 31 which abuts against the outer race of the bearing 23 which in turn receives the lateral forces on the roll towards the right from the shoulder 8 to the inner race of the bearing 22 through the ball bearing to the outer race shoulder of the bearing 22 and thence to the outer race of the bearing 23 to the ring 31. This ring may be backed up with shims by the head 32. However, none are shown. The head 32 is bolted to the end of the housing 10 and provides a bore in which the second seal member 33 is inserted by a force fit against the shoulder 34.

Figure 2:
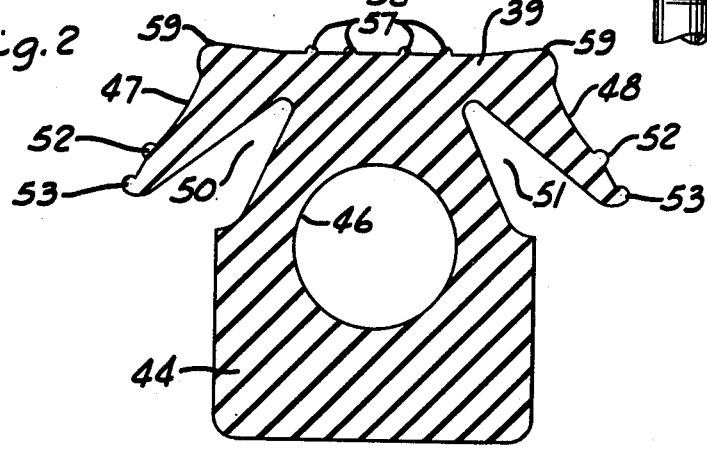
FIG. 2 is a view of the seal member as a free body.
Figure 3:
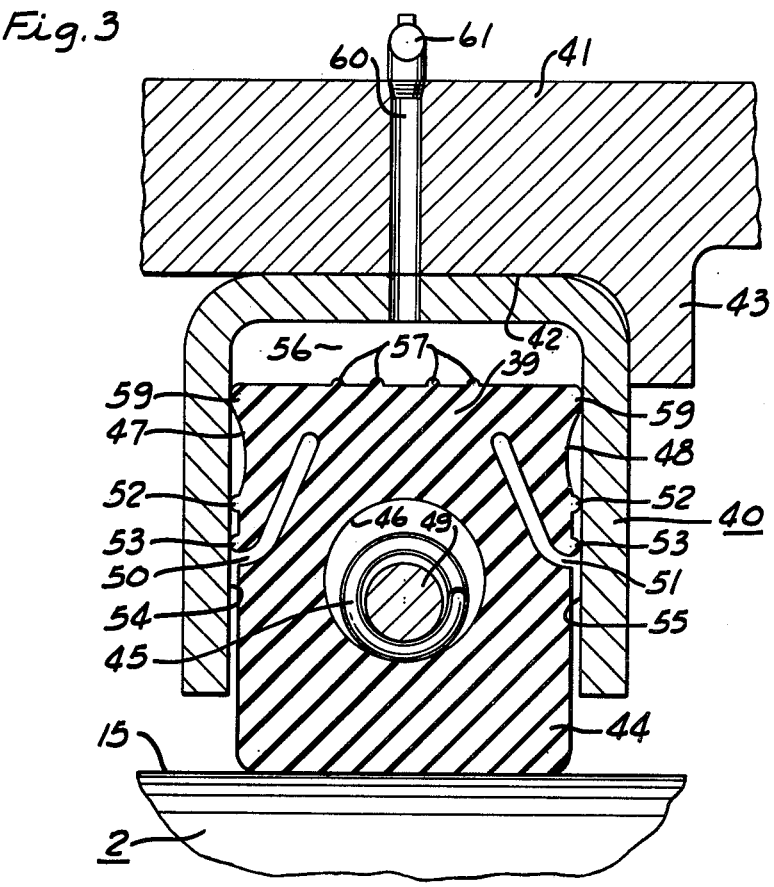
FIG. 3 is an enlarged view of the seal member as mounted in the annular seal chamber.

The lubricant which is principally oil is circulated through the passageways indicated at 35 until it enters the annular chamber 36 from thence it is forced under pressure of approximately fourteen pounds through the bearing between the cadmium bushing 18 and the sleeve 3 laterally requiring that the oil provide the actual support of the weight and pressure load on the roll. The oil being forced through this long bearing, then must pass through the antifriction bearings 22 and 23 to the chamber 37 where it is discharged to the longitudinal chamber 38 and out a discharge pipe from whence it is collected, recleaned, cooled and reconditioned for circulation through the system. Thus the seals 12 and 33 which are similar in size and structure retain the lubricant pressure within the bearing system. The heads 39 of these seals as shown in FIGS. 2 and 3 are inserted in the annular seal housing 40 which is preferably made of steel, brass or bronze and is nothing but an annular ring and it is forced by pressure into the housing such as illustrated at 41 which may be either the housing 10 or the ring 32. In any event the annular sealing housing 40 is forced with pressure into the surface 42 against the shoulder 43 which fit is sufficient to retain the fourteen to twenty pounds lubricant pressure and nothing is needed to safeguard the annular seal chamber 40 from moving out of its pressed shape as it would be engaged by either the bushing 18 or the ring 31 and could do no harm.

The seals 12 and 33 are formed from natural or synthetic rubber or elastomer and are shown in FIGS. 2 and 3 and have a head 39 and a body 44. These seals are preferably extruded in straight form and are cut to length and one end of the garter spring 45 is threaded through the central bore 46 in the body 44 and connected together and a constriction restrictor 49 is inserted in the garter spring and the ends of the garter spring are then threaded to a connector which joins them together and retains the constriction restrictor as shown in FIG. 3 of U.S. Patent 2,948,527. The constriction restrictor 49 permits the garter spring 45 to expand but the constriction restrictor 49 prevents it from becoming any smaller than the diameter determined by the length of the restrictor 49 when its opposite ends engage the connector. Thus the restrictor 49 is somewhat smaller than the inner diameter of the helical garter spring 45 and when in position the garter spring cannot get any smaller than the length of this restrictor, but if expanded, the garter spring may become as large as possible within the elasticity of the elastomer seal which would be greater limitation than the expansion of the helical coil spring 45.

The principal feature and characteristic of this seal is the provision of a larger head than the body and also the provision of oppositely disposed annular flange members 47 and 48 which are formed by this extrusion. These flanges when free as shown in FIG. 2 normally extend outwardly providing the side chambers 50 and 51 within the dimension of the seal. However, when the seal head 39 must be compressed to be inserted in the annular housing 40 the sides of the seal body 44 have clearance with the sides of the annular seal housing 40 but the abutments 59 and parallel ridges 52 and 53 on the outer face of each flange 47 and 48 engage and seal with the corresponding opposed seal faces 54 and 55 on the annular flanges of the housing 40 and almost closes the chambers 50 and 51 as shown in FIG. 3. This provides an annular seal chamber 56 in the housing 40 above the seat which is sealed by both sides of the seal. The flanges 47 and 48 are at all times pressing outwardly owing to the manner in which the seal's material was extruded. However, any pressure that accumulates on either side may readily flow up into the space of the side chambers 50 or 51 and increase the pressure of the seal of the annular ridges 52 and 53 against their respective sealing surfaces 54 and 55.

The flanges of the seal housing 40 providing the sealing surfaces 54 and 55 that enclose the annular chamber 56, are spaced from the cylindrical surface 15 of the roll neck 2 such that any lateral movement of the roll neck, of which there may be considerable, permits the seal to move radially or laterally of the seal housing 40 without interrupting or otherwise breaking the seal. This factor together with the fact that only abutments 59 and ridges 52 and 53 on each flange perform the sealing function permits this seal to operate at very high speeds even though the diameter of the seal is comparatively large which may also induce a seal force due to centrifugal action but still maintains good sealing characteristics. The seals 12 and 33 may be shoved longitudinally of the roll neck axis and still maintain their sealing driving engagement.

The outer perimetral surface of the head 39 is provided with the annular ridges 57. These ridges prevent the chamber 56 from ever becoming completely eliminated at one point due to radial movement of the seal in the housing if such a condition would be conceivable. However, under practice the spacing of the chamber 56 is usually adequate to prevent the necessity of the annular ridges 57.

A passageway 60 leading into the annular chamber 56 through the housing 41 is provided with a check valve grease fixture 61 for the purpose of aiding the semi-fluid grease or heavy cup grease to the chamber 56. This grease together with the graphite properly lubricates the flange sealing faces. This grease when supplied under pressure will force out any dirt that may have attempted to pass into the chamber 56 and will at all times assure that the abutments 59 will be in contact with the annular radial surfaces 54 and 55.

The seal section shown in FIG. 5 is similar to that shown in FIG. 2 but the head 39 is cut along the line 62. The elastomer seal is preferably extruded in the shape shown and is thereafter cut to show the assembled garter spring 45 and the constriction restrictor 59 to be expanded and then inserted into the annular bore 46 through the slot formed by the cut 62. With this construction the garter spring 45 may be hooked together in any desired manner and the constriction restrictor 49 would have its ends engage the hooks of the garter spring as abutments to limit the constriction of the seal without the use of a threaded connector as shown in FIG. 4.

Figure 6:
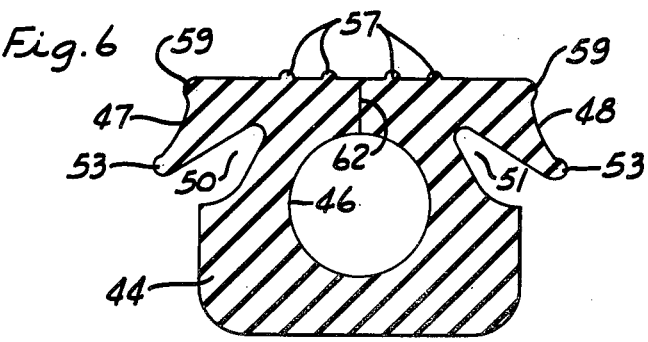
FIG. 6 is a sectional view of a modified form of seal shown as a free body with a slit head.

In FIG. 6 the seal structure is merely of different configuration. The head 39 is substantially as wide as that shown in FIG. 2 but the depth of the seal is approximately one-third of that of FIG. 2. This change in the dimension of these seals necessitates small changes in the shape of the flanges 47 and 48 which makes the abutments 59 closer to the flange seal beads 53. Thus the seal beads 52 are eliminated in FIG. 6.

When the elastomer 54 is cut to length and held as a ring on the roll neck by the garter spring 45 and restrictor 49 it will grip the surface of the neck 15 or the ring 24 and grip it sufficiently to seal on the same and cause the body of the seal to rotate therewith as the abutting ends also seal without being cemented together.

I claim:

A rotary shaft seal for use against opposed radial sealing faces defining an annular closed chamber surrounding a shaft, an elastomer seal element in the form of an annularly disposed elastomer having integral annular head and body portions disposed radially of each other and separated by inwardly extending side chambers on each side of the seal element, said body portion having a continuous broad surface to engage on and seal with the shaft, said head and body portions extending into said closed chamber, an annular flange extending outwardly from each side of said head when free and directed toward the body portion and extending over at least part of said side chambers, annular raised sealing ridge means on the outer face of each flange to normally engage and seal with said sealing faces, the sides of said body portion normally having a clearance space from said sealing faces, an annular abutment on each side of said head portion under contraction when in normal sealing engagement with said sealing faces and solid elastomer material in a direct path across said head portion between said abutments to prevent said elastomer from rolling over in said closed chamber when the shaft moves axially causing said body portion to engage the seal face.

References Cited by the Examiner

UNITED STATES PATENTS

| 2,210,823 | 8/40 | Victor et al. | 277—25 |
| 2,488,465 | 11/49 | Bourne | 277—152 |
| 2,888,281 | 5/59 | Ratti | 277—25 |
| 2,948,527 | 8/60 | Gilbert | 277—146 XR |
| 2,983,533 | 5/61 | Tisch | 277—209 |

FOREIGN PATENTS 1,156,835  12/57  France.

LAVERNE D. GEIGER, Primary Examiner.

SAMUEL ROTHBERG, EDWARD V. BENHAM, LEWIS J. LENNY, Examiners.